United States Patent
Ivanova et al.

(10) Patent No.: US 7,490,102 B2
(45) Date of Patent: Feb. 10, 2009

(54) SYSTEM AND METHOD FOR INTERACTING WITH A PERSISTENCE LAYER

(75) Inventors: Viktoriya Ivanova, Sofia (BG); Dirk Debertin, Karisruhe (DE); Rainer Schweigkoffer, Mannheim (DE); Gerd Kluger, Sinsheim (DE); Svetoslav Manolov, Sofia (BG)

(73) Assignee: SAP AG, Walldorf (DE)

( * ) Notice: Subject to any disclaimer, the term of this patent is extended or adjusted under 35 U.S.C. 154(b) by 410 days.

(21) Appl. No.: 10/862,914

(22) Filed: Jun. 7, 2004

(65) Prior Publication Data

US 2006/0004855 A1   Jan. 5, 2006

(51) Int. Cl.
*G06F 17/30* (2006.01)

(52) U.S. Cl. ............... 707/103 Y; 707/103 R; 715/200

(58) Field of Classification Search ............... None
See application file for complete search history.

(56) References Cited

U.S. PATENT DOCUMENTS

| | | | | |
|---|---|---|---|---|
| 6,591,272 | B1 * | 7/2003 | Williams | 707/102 |
| 6,941,298 | B2 * | 9/2005 | Chow et al. | 707/3 |
| 7,069,553 | B2 * | 6/2006 | Narayanaswamy et al. | 717/173 |
| 2001/0034733 | A1 * | 10/2001 | Prompt et al. | 707/102 |
| 2003/0182273 | A1 * | 9/2003 | Goldberg et al. | 707/3 |

* cited by examiner

*Primary Examiner*—Hosain T Alam
*Assistant Examiner*—Johnese Johnson
(74) *Attorney, Agent, or Firm*—Blakely, Sokoloff, Taylor & Zafman

(57) ABSTRACT

A system and method are provided for interacting with a persistence layer. In an embodiment, a persistence layer may receive a representation of Enterprise Java Bean (EJB) metadata. The persistence layer may determine whether the representation of Enterprise Java Bean (EJB) metadata is compatible with a version of the EJB specification. In an embodiment, a representation of an Object-Relational (OR) mapping schema may be generated based, at least in part, on the representation of EJB metadata.

19 Claims, 16 Drawing Sheets

SYSTEM AND METHOD FOR INTERACTING WITH A PERSISTENCE LAYER

TECHNICAL FIELD

Embodiments of the invention generally relate to the field of data processing and, more particularly, to a system and method for interacting with a persistence layer.

BACKGROUND

Many businesses are providing access to their products and services through applications that are delivered over computer networks such as the Internet. These applications typically have a multi-tiered architecture. In those cases where the applications are delivered over the Internet they are commonly referred to as Web-based applications. FIG. 1 is a block diagram of a Web-based application 100 having a multi-tiered architecture.

Web-based application 100 includes client layer 110, application layer 120, and database layer 130. Client layer 110 includes user interface 112 that runs on a client computing device such as a desktop computer, laptop computer, personal digital assistant, telephone, and the like. In a Web-based environment, user interface 112 is typically a Web browser. User interface 112 may collect input from a user and provide that input to application layer 120 for processing.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP), HTTP secured through the Secure Socket Layer, the Simple Object Access Protocol (SOAP), and the like. Presentation logic 142 generates a Graphical User Interface (GUI) using, for example, a markup language such as the Hyper Text Markup Language (HTML). Business logic 144 represents the core of the application, for example, the rules governing the underlying business process (or other functionality) provided by the application. Database interface layer 146 provides an interface to database layer 130. The Java 2 Enterprise Edition Specification v1.3, published on Jul. 27, 2001 (the J2EE Standard) defines an increasingly popular architecture for application layer 120.

Database layer 130 includes data access logic used by business logic 144 to store and retrieve data in database 132. Database 132 provides non-volatile storage (sometimes referred to as a persistent store) for the data accessed and/or processed by application layer 120. Database 132 may be, for example, a relational database or an object-oriented database.

In some cases, business logic 144 may be implemented with Enterprise Java Beans (EJBs). EJBs are server-side J2EE components that provide business logic and represent persistent data. Although EJBs provide a flexible architecture for business logic 144, they also introduce a certain amount of complexity.

FIG. 2 is a block diagram of distributed system 200 illustrating some of the complexity of implementing business logic 210 with EJBs 211-216. EJBs 211-216 are developed from an objected-oriented point-of-view. That is, objects are typically accessed by identifying a first object as a starting point and finding additional objects by, for example, following references or calling methods. In contrast, database 220 is typically organized according to a completely different organizational model that is based on set-oriented query and update statements.

Conventional mapping architecture 230 attempts to map the object-oriented domain of business logic 210 to the relational domain of database 220. Conventional mapping architecture 230 is typically only able to process a limited set of the queries that are generated by business logic 210. In addition, conventional mapping architecture 230 is typically constrained to interoperating with a database provided by a particular vendor. Conventional mapping architecture 230 typically lacks the capacity to perform a variety of validity and compatibility checks on the metadata and schemas defining various aspects of the architecture.

SUMMARY OF THE INVENTION

A system and method are provided for interacting with a persistence layer. In an embodiment, a persistence layer may receive a representation of Enterprise Java Bean (EJB) metadata. The persistence layer may determine whether the representation of Enterprise Java Bean (EJB) metadata is compatible with a version of the EJB specification. In an embodiment, a representation of an Object-Relational (OR) mapping schema may be generated based, at least in part, on the representation of EJB metadata.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A system and method are provided for interacting with a persistence layer. In an embodiment, a persistence layer may receive a representation of Enterprise Java Bean (EJB) metadata. The persistence layer may determine whether the representation of Enterprise Java Bean (EJB) metadata is compatible with a version of the EJB specification. In an embodiment, a representation of an Object-Relational (OR) mapping schema may be generated based, at least in part, on the representation of EJB metadata.

Figure 1:
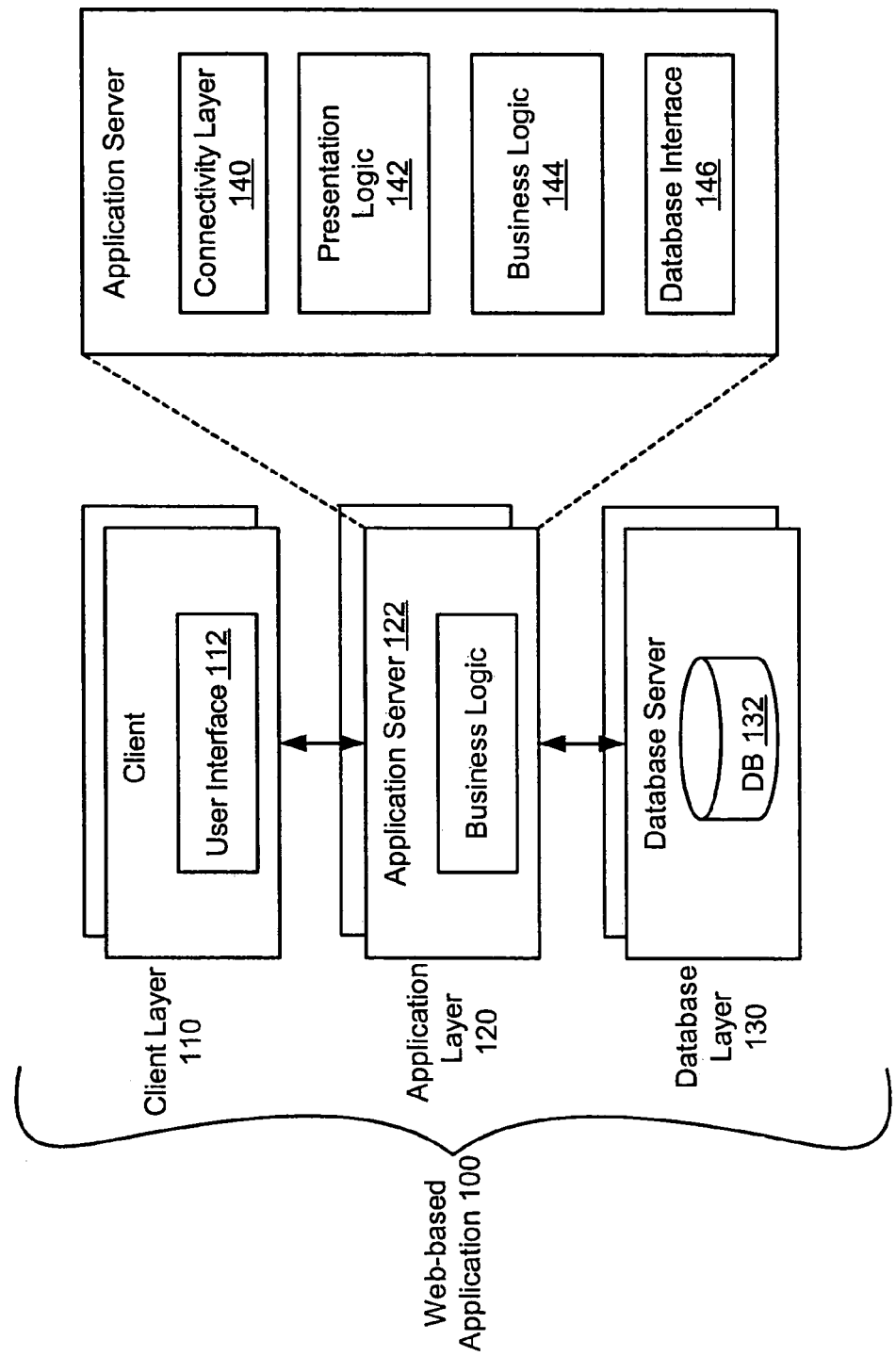
FIG. 1 is a block diagram of a Web-based application having a multi-tiered architecture.
Figure 2:
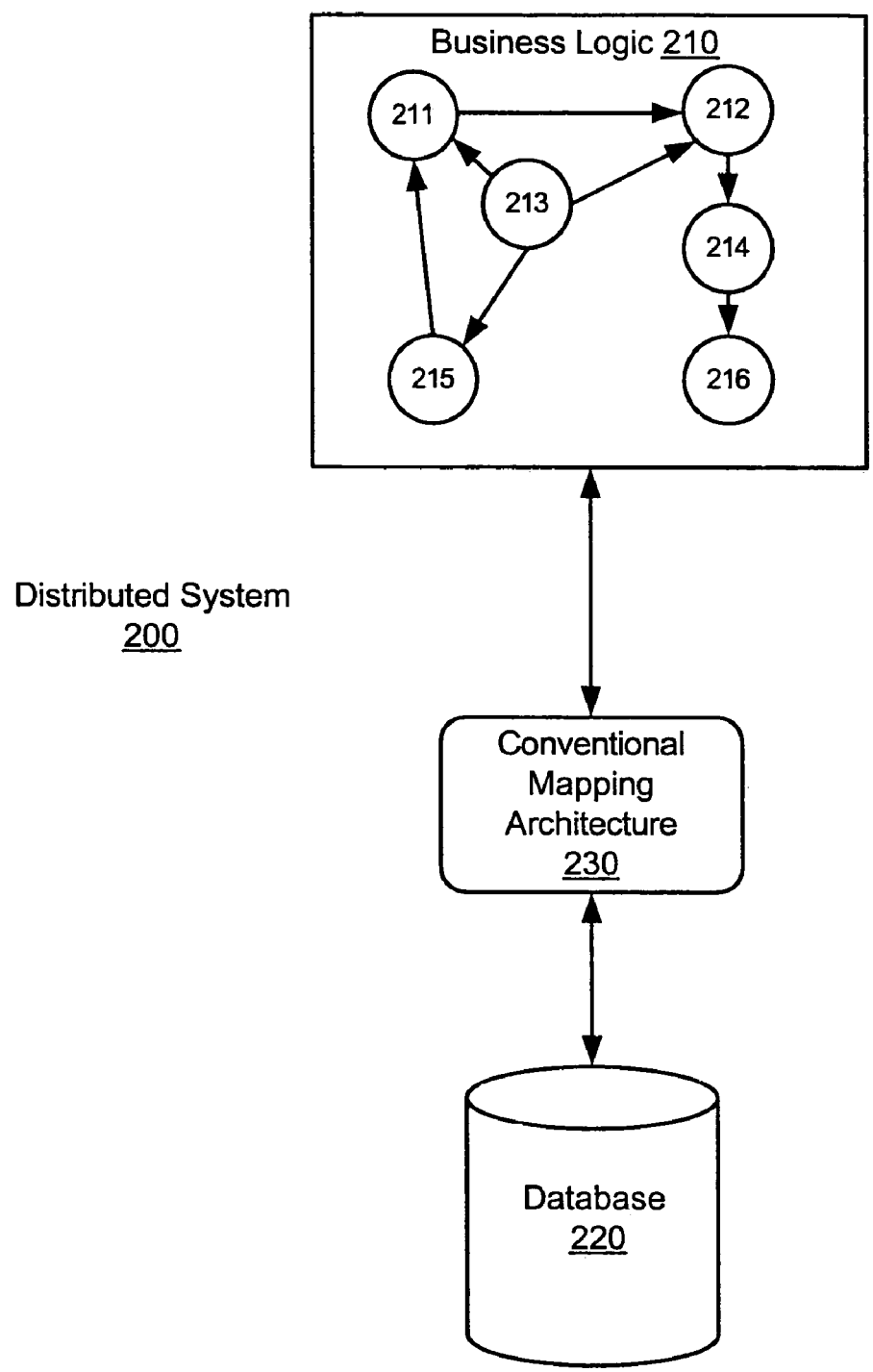
FIG. 2 is a block diagram of a distributed system that illustrates some of the complexity of implementing business logic with Enterprise Java Beans (EJBs).
Figure 3:
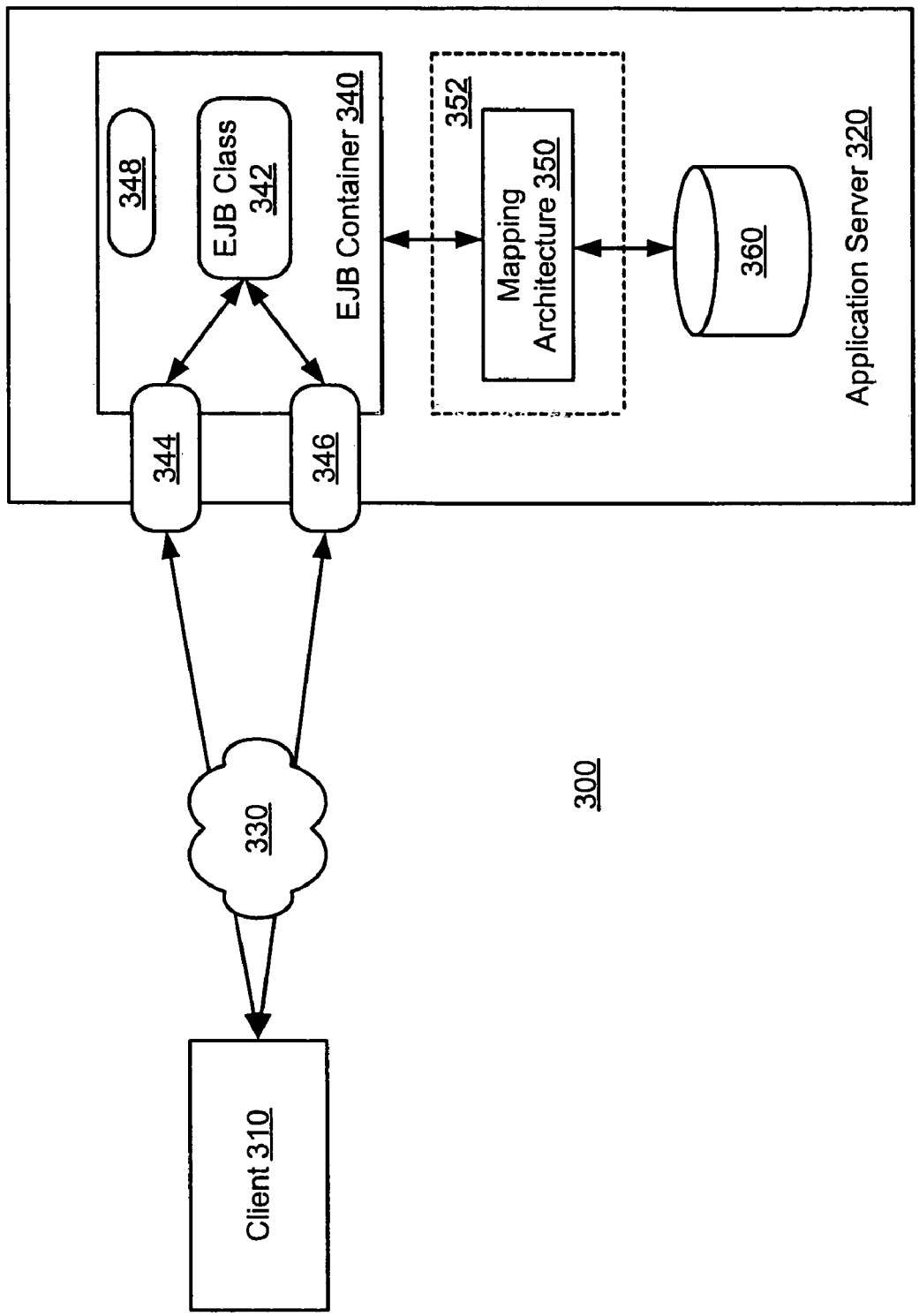
FIG. 3 is a block diagram illustrating a distributed system implemented according to an embodiment of the invention.

FIG. 3 is a block diagram illustrating distributed system 300 implemented according to an embodiment of the invention. Distributed system 300 includes client 310 and application server 320. Client 310 may collect input from a user and provide that input to application server 320 via network 330 for processing. Client 310 may be, for example, a desktop computer, a laptop computer, a personal digital assistant, a telephone, an application server, and the like. Network 330 may be, for example, any combination of a wired or wireless Local Area Network (LAN), Wide Area Network (WAN), Metropolitan Area Network (MAN), intranet, and/or the Internet.

Application server 320 receives information from client 310 and may generate a response after processing the information. In an embodiment, application server 320 is based, at least in part, on the J2EE standard (e.g., IBM's Websphere platform). In an alternative embodiment, application server 320 may be based on a different platform such as Microsoft Corporation's .Net platform. The illustrated embodiment of application server 320 includes EJB container 340, mapping architecture 350, and database 360. In an alternative embodiment, application server 320 may include more elements, fewer elements, and/or different elements.

EJB container 340 is the environment in which EJBs reside. EJB container 340 enables multiple EJBs to be deployed to application server 320 and makes them accessible through a naming service such as the Java Naming and Directory Interface (JNDI). EJB container 340 provides deployed beans with services such as persistence, transaction handling, pooling, security, exception handling, and the like. At runtime, EJB container 340 creates instances of the bean class (e.g., bean class instance 342) and manages the lifecycle of the instances of the bean class.

An EJB typically has four basic elements: instance of the bean class 342, object interface 344, home interface 346, and deployment descriptor 348. Bean class 342 implements business methods that may be declared in, for example, object interface 344. Home interface 346 may define one or more methods used by client 310 to find and/or remove bean class 342. Deployment descriptor 348 may be an eXtensible Markup Language (XML) file containing metadata that, for example, describes an EJB's structure and its relationships to other EJBs. An entity EJB is an EJB that represents specific data or collections of data such as a row in a relational database (e.g., database 360).

In an embodiment, mapping architecture 350 receives persistency requests from EJB container 340 and generates Structured Query Language (SQL) statements based, at least in part, on the received persistency requests. EJB container 340 may use the generated SQL statements to, for example, implement Container Managed Persistence (CMP). In one embodiment, mapping architecture 350 is an element of persistency layer 352. In an embodiment, persistency layer 352 provides an interface between an application layer and a database layer. Persistency layer 352 may include, for example, a Java Database Connectivity (JDBC) API, various buffers, communications protocols, and the like that facilitate the interaction between EJB container 340 and database 360.

In an embodiment, the persistency requests received by mapping architecture 350 may be grouped into two categories: user-defined EJB Query Language (EJBQL) persistency requests and EJB container persistency requests. In an embodiment, user-defined EJBQL persistency requests may be based, at least in part, on ejbSelect( ) methods and ejbFinder( ) methods. Similarly, in an embodiment, EJB container persistency requests may be based, at least in part, on ejbLoad( ) methods, ejbStore( ) methods, and/or ejbRemove( ) methods as well as methods for manipulating and maintaining Container Managed Relationships (CMRs). Mapping architecture 350 is further described below with reference to FIGS. 4-7.

Figure 4:
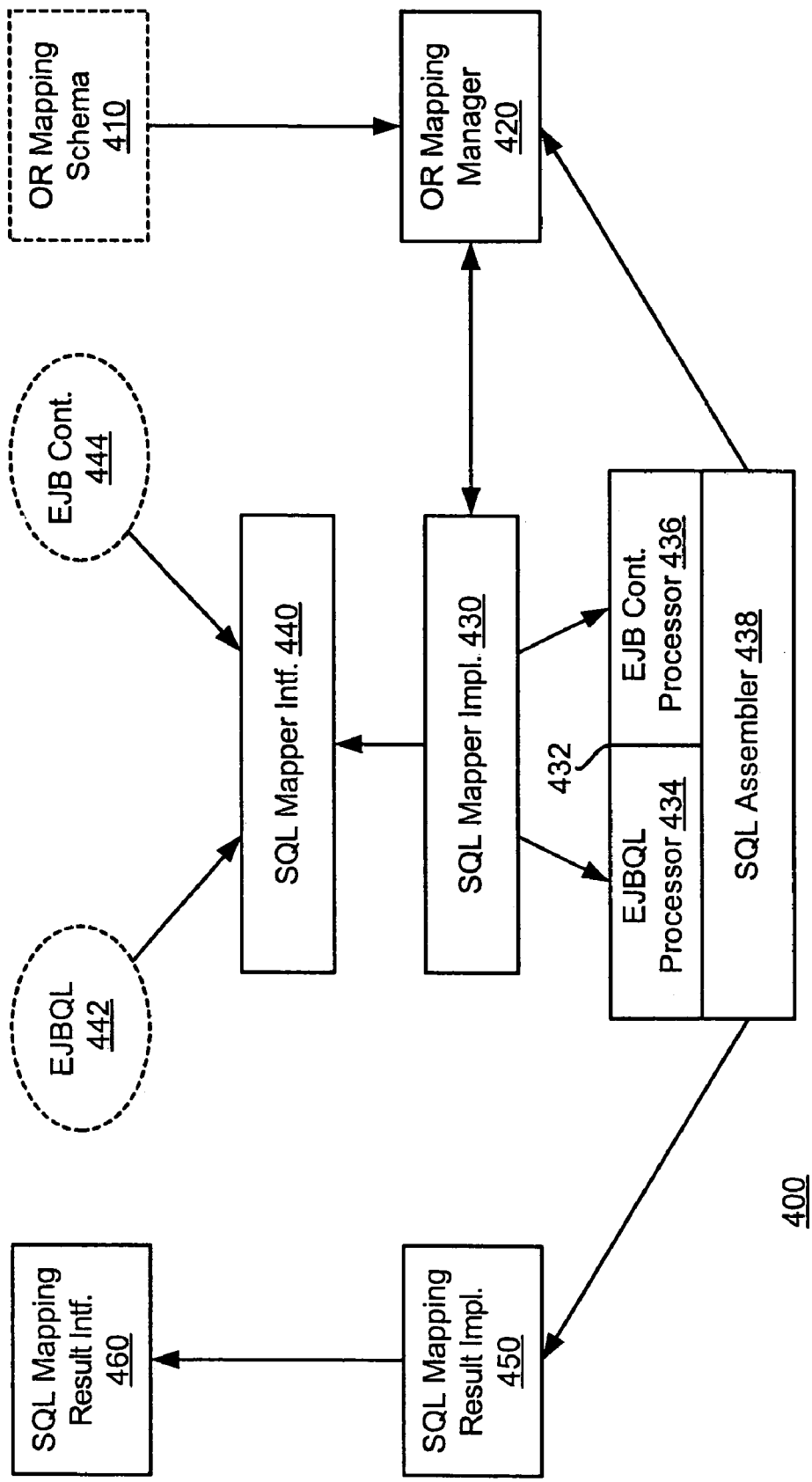
FIG. 4 is a block diagram of selected aspects of a mapping architecture, implemented according to an embodiment of the invention.

FIG. 4 is a block diagram of selected aspects of mapping architecture 400, implemented according to an embodiment of the invention. In an embodiment, mapping architecture 400 receives persistence requests from an EJB container (e.g., EJB container 340, shown in FIG. 3), generates SQL statements based, at least in part, on the persistence requests, and provides the SQL statements to the EJB container (e.g., via SQL mapping result interface 460).

In an embodiment, mapping architecture 400 is assigned an Object/Relational (OR) mapping schema 410 to determine the mapping between, for example, entity EJBs, database tables (e.g., the tables of database 360, shown in FIG. 3), and Container Managed Relations (CMRs). In an embodiment, mapping architecture 400 wraps OR mapping schema 410 into OR mapping manager 420. Mapping manager 420 may transform the data provided by OR mapping schema 410 into the form used by the classes of mapping architecture 400. In addition, mapping manager 420 may cache a derived form of the data (or a portion of the data) to increase the performance of mapping architecture 400. In one embodiment, the methods of various elements of mapping architecture 400 (e.g., the methods of OR mapping manager 420) are thread safe.

In an embodiment a catalog reader may validate the data in OR mapping schema 410 against an underlying database (e.g., database 360, shown in FIG. 3). In such an embodiment, OR mapping manager 420 may provide a catalog interface. The catalog interface may be implemented with a number of classes including, for example, an ORMapCatalogReader class, an ORMapColumnIterator class, a TableDescriptor class, and/or a ColumnDescriptor class.

In an embodiment, SQL mapper implementation 430 provides a number of interfaces and classes to implement the core functionality of mapping architecture 400. For example, in an embodiment, SQL mapper implementation 430 provides SQL mapper interface 440 to receive persistence requests from an EJB container (e.g., EJB container 340, shown in FIG. 3). In one embodiment, the received requests may include EJBQL persistence requests 442 and/or EJB container persistence requests 444. In an embodiment, SQL mapper interface 440 passes the received persistence requests to SQL mapper implementation 430 for processing.

In an embodiment, SQL mapper implementation 430 employs a two-layer set of classes to process persistence requests that it receives from SQL mapper interface 440. For example, the illustrated embodiment of SQL mapper implementation 430 includes EJB interpreting layer 432 and SQL assembly layer 438. In one embodiment, the purpose of EJB interpreting layer 432 is to interpret received EJB persistence requests and to send a sequence of commands (e.g., method calls) to the SQL assembly layer 438. In an embodiment, the purpose of SQL assembly layer 438 is to assemble SQL statements based, at least in part, on the sequence of commands received from EJB interpreting layer 432.

In an embodiment, EJB interpreting layer 432 is divided into two sections: EJBQL persistence request processor 434 (or, for ease of discussion, EJBQL processor 434) and EJB container persistence request processor 436 (or, for ease of discussion, EJB container processor 436). In such an embodiment, the purpose of EJBQL processor 434 is to interpret EJBQL persistence requests and to send a sequence of commands to SQL assembly layer 438 based, at least in part, on the persistence requests. Similarly, the purpose of EJB container processor 436 may be to interpret EJB container persistence requests and send a sequence of commands to SQL assembly layer 438 based, at least in part, on the persistence requests. SQL mapper implementation 430 is further discussed below with reference to FIGS. 5-7.

In an embodiment, the output of SQL mapper implementation 430 is described by SQL mapping result implementation 450. In one embodiment, the SQL statement(s) provided by SQL mapping result implementation 450 are organized as a tree structure in which each element of the SQL statement is represented by a node of the tree structure. Organizing the information in a tree structure enhances the processing of persistence requests by providing a more efficient, more complete, and reusable presentation of data related to a persistence request (e.g., data source, type of statement, conditional clauses, etc.). An example of an SQL statement organized as a tree structure is shown below with reference to FIG. 6.

In one embodiment, the SQL statement(s) provided by SQL mapping result implementation 450 are database-independent. The term "database-independent" refers to, for example, an SQL statement that is portable across a number of databases provided by a number of different vendors. In such an embodiment, SQL mapper implementation 430 may map a received persistence request to an SQL statement that is known to be database-independent. For example, in an embodiment, a set of SQL statements may be chosen that are a subset of standard SQL-92 statements, for example, a subset of statements that comply with the American National Standards Institute/International Organization or Standardization (ANSI/ISO) 9075: 1992 Information Technology—Database Languages—SQL standard (hereinafter, the SQL-92 Standard). The subset of standard SQL-92 statements may be selected, at least in part, based on whether they are database-independent. In one embodiment, the subset of standard SQL-92 statements is supplemented with additional SQL statements that are known to be database-independent.

In an embodiment, SQL mapping result implementation 450 implements mapping result interface 460 to provide the SQL mapping result to an EJB container (e.g., container 340, shown in FIG. 3). Mapping result interface 460 may provide an implementation of one or more methods that provide access to an SQL mapping result and/or manipulation of an SQL mapping result. For example, in an embodiment, mapping result interface 460 may provide a method to determine whether an SQL mapping result is database-independent.

In an embodiment, SQL mapping result implementation 450 may derive database-specific SQL statements for given database vendors from its internal database-independent SQL statement representation. For example, one or more methods may be provided that allow an end-user (or program) to specify a specific database (e.g., via a database product name and/or a database vendor identifier). In an embodiment, the one or more methods may be used by SQL mapping result implementation 450 to derive an SQL statement string representation of the SQL statement that is specific to the identified database.

Figure 5:
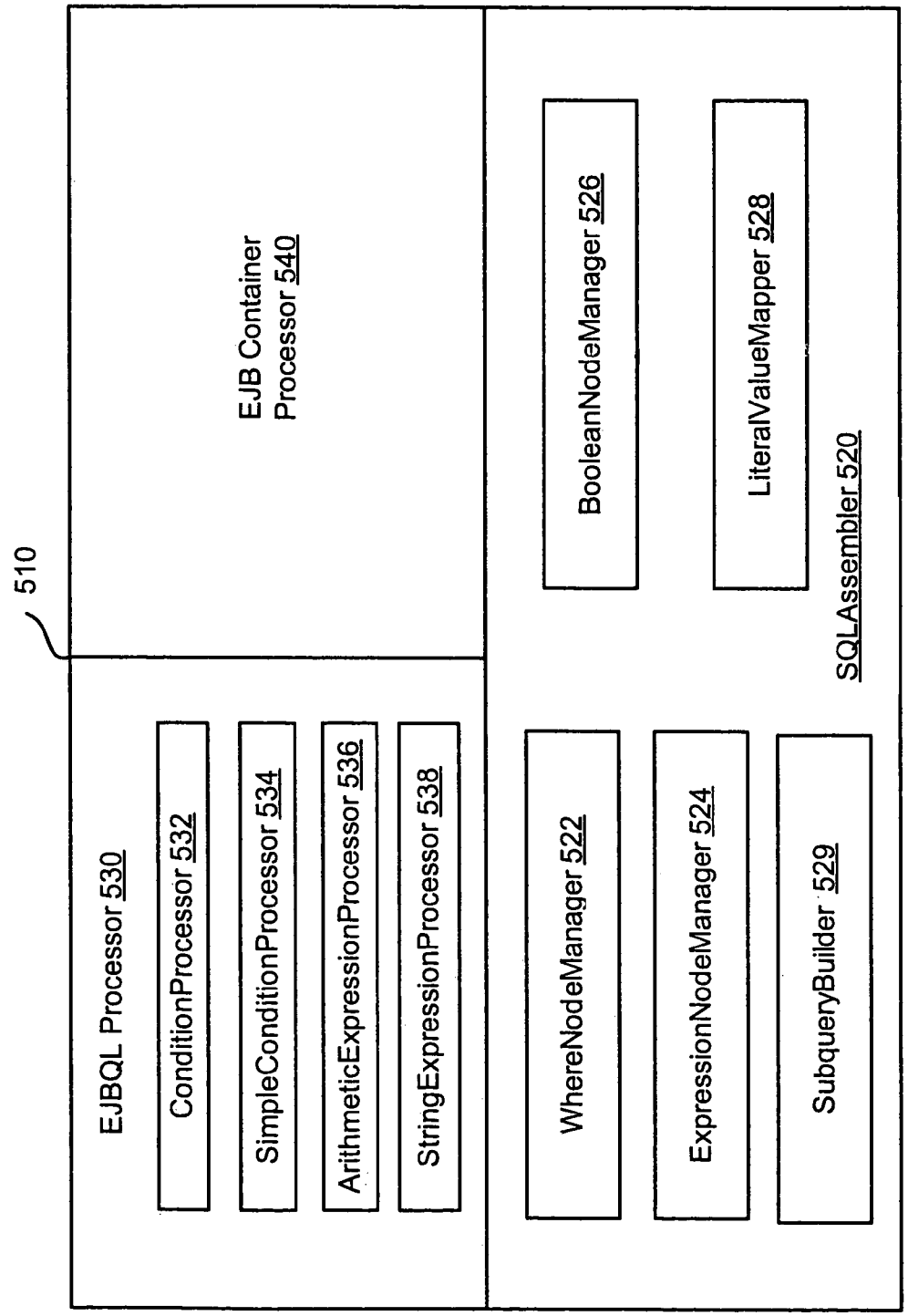
FIG. 5 is a block diagram of selected aspects of an SQL mapper implementation, implemented according to an embodiment of the invention.

FIG. 5 is a block diagram of selected aspects of SQL mapper implementation 500, implemented according to an embodiment of the invention. The illustrated embodiment includes EJB interpreting layer 510 and SQL assembly layer 520. In an alternative embodiment of the invention, SQL mapper implementation 500 may include more elements, fewer elements, and/or different elements than those depicted in FIG. 5.

In an embodiment, EJB interpreting layer 510 includes EJBQL processor 530 to interpret EJBQL persistence requests. In one embodiment, the received EJBQL persistence requests are organized as tree structures in which each element of the persistence request is represented by a node of the tree structure. In such an embodiment, EJBQL processor 530 traverses the tree structure representing the EJBQL persistence request and transforms the information it encounters into appropriate method calls to underlying SQL assembly layer 520. In an embodiment, SQL assembly layer 520 assembles an SQL statement in a step-wise fashion as it receives the method calls from EJBQL processor 530. In such an embodiment, once EJBQL processor 530 has completely traversed the tree structure representing the persistence request, SQL assembly layer 520 has completely assembled, for example, an SQL statement representing the original EJBQL persistence request.

In an embodiment, EJBQL processor 530 employs a number of classes to interpret the received persistence request. For example, the illustrated embodiment includes ConditionProcessor class 532, SimpleConditionProcessor class 534, ArithmeticExpressionProcessor class 536, and StringExpressionProcessor class 538. In an embodiment, ConditionProcessor class 532 interprets combined conditions of a WHERE clause within the received persistence request. Similarly, SimpleConditionProcessor class 534 may interpret elementary conditions (as well as simple arithmetic and Boolean conditions) of the WHERE clause. In an embodiment, ArithmeticExpressionProcessor class 536 may be used to interpret more complex arithmetic expressions. In an embodiment, StringExpressionProcessor class 538 may be used to interpret one or more of the string expressions in a persistence request. SQL mapper implementation is easy-to-extend because, for example, new classes may be added to one or more of its layers to extend the functionality of the layer.

In an embodiment, EJB interpreting layer 510 includes EJB container processor 540 to process persistence requests from an EJB container (e.g., EJB container 340, shown in FIG. 3). The EJB container persistence requests may be directed to loading, storing, and removing EJBs as well as manipulating and maintaining Container Managed Relations (CMRs) between EJBs. In an embodiment, EJB container processor 540 receives EJB container persistence requests and, for each type of persistence request, sends a sequence of commands to SQL assembly layer 520. In an embodiment, the sequence of commands sent by the EJB container processor 540 are similar to those sent by EJBQL processor 530. In an embodiment, the sequence of commands is extended to handle the persistence requests directed to CMRs that may be received from the container.

SQL assembly layer 520 assembles SQL statements based, at least in part, on the commands (e.g., method calls) that it receives from EJB interpreting layer 510. In an embodiment, SQL assembly layer 520 provides a tree representation of the assembled SQL statement. In an embodiment, SQL assembly layer 520 employs one or more classes to assemble an SQL statement. For example, WhereNodeManager class 522 may generate a subtree of logic predicates representing an SQL statement's WHERE clause. In an embodiment, ExpressionNodeManager class 524 compiles the expressions used within those predicates.

Certain versions of the Java Database Connectivity (JDBC) Application Program Interface (API) may not support Boolean expressions (e.g., versions earlier than JDBC ver. 3.0). BooleanNodeManager class 526 may provide mappings to alternative expressions when mapping to Boolean expressions is not supported by the JDBC API. For example, if a WHERE predicate's right operand expression is to inherit type mapping from its corresponding left operand expression, BooleanNodeManager class 526 may support the type mapping. In an embodiment, Boolean literal values may be appropriately transformed in accordance with a prevailing type mapping. In such an embodiment, LiteralValueMapper class 528 may provide the appropriate transformation. Some constructs of a persistence request may involve the use of subqueries within an SQL statement. In an embodiment, SubqueryBuilder class 529 generates subqueries, as needed, for the SQL statement.

Figure 6A:
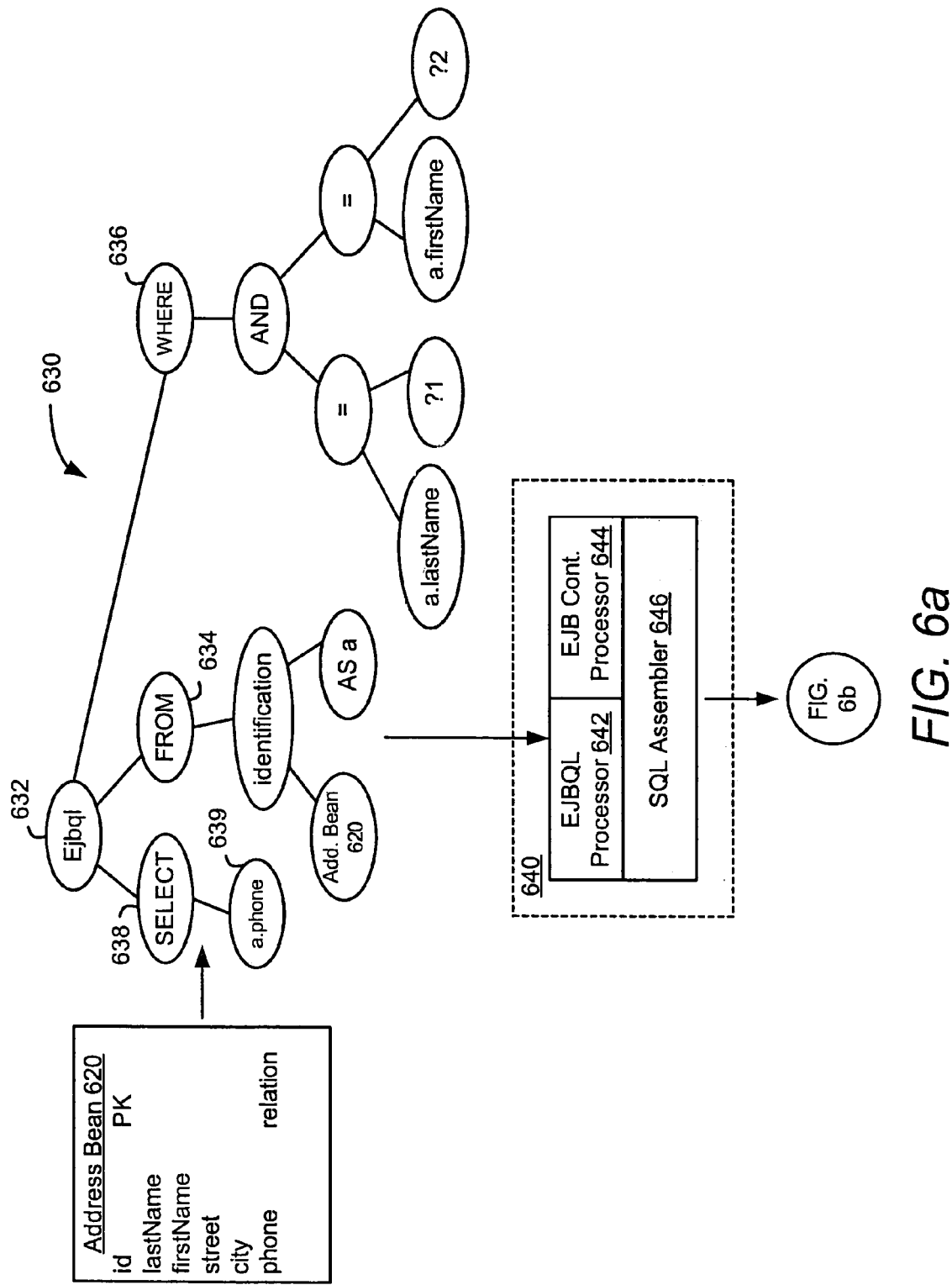
FIGS. 6a-6b are a conceptual illustration of generating an SQL statement, according to an embodiment of the invention.
Figure 6B:
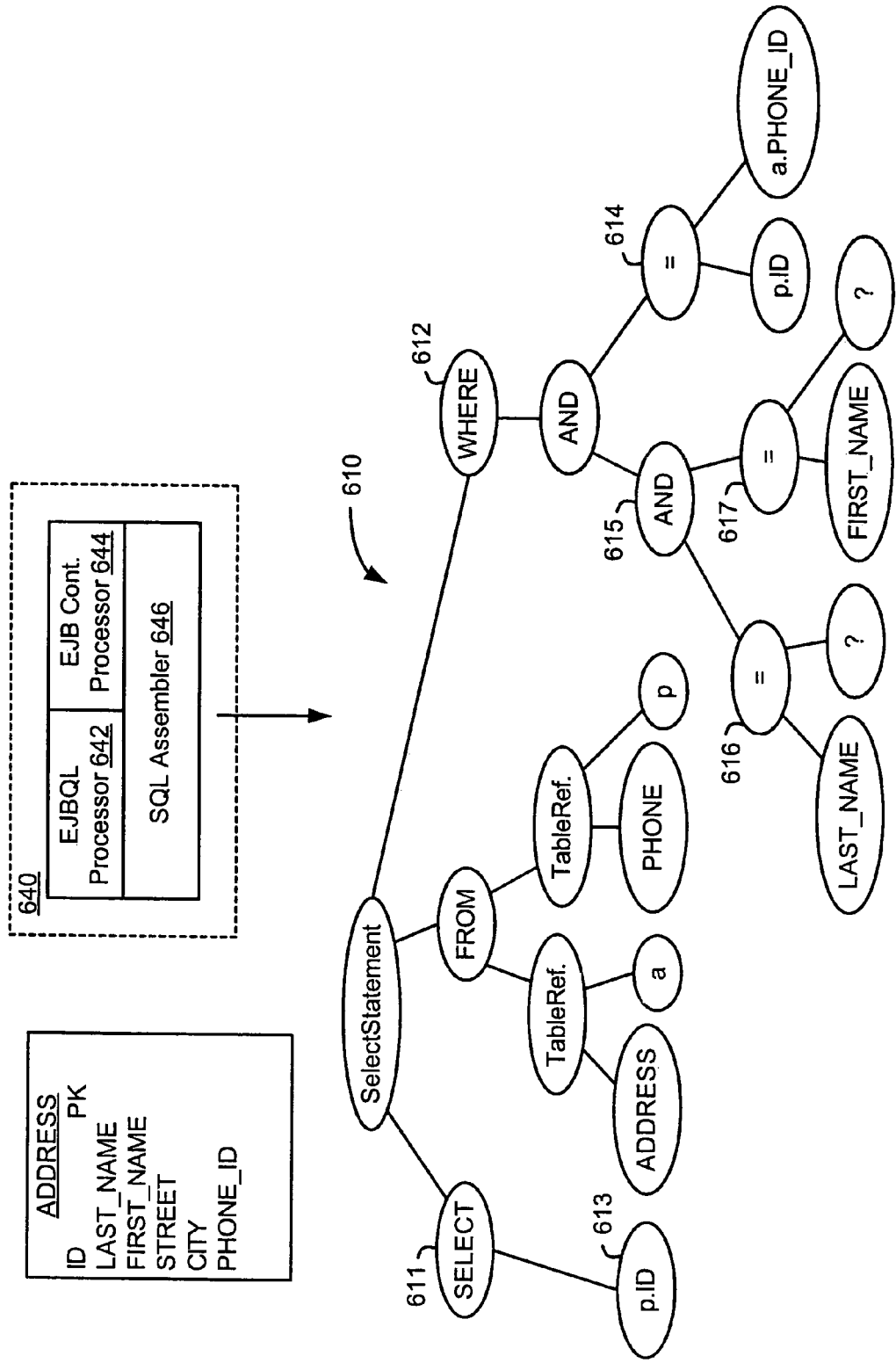

FIG. 6 is a conceptual illustration of generating SQL statement 610, according to an embodiment of the invention. In an embodiment, an EJB may include a number of user-defined EJBQL persistence requests (e.g., defined in the deployment descriptor of the EJB). Listing 1 shows an illustrative user-defined EJBQL persistence request corresponding to FIG. 6

Listing 1

SELECT a.phone FROM AddressBean AS a WHERE a.lastName=?1 AND a.firstName=?2

In an embodiment, an EJBQL parser (not shown) parses, for example, the persistence request shown in Listing 1 and generates a tree structure representation of the persistence request as shown by EJBQL tree structure 630. In an embodiment, each node of EJBQL tree structure 630 represents an element of the persistence request shown in Listing 1. For example, EJBQL node 632 may represent the EJBQL persistence request generally while from node 634 and where node 636 represent the FROM clause and WHERE clause of the EJBQL persistence request. In an embodiment, relationships between EJBs may be also be represented by EJBQL tree structure 630. For example, a.phone node 639 may represent a relationship between address bean 620 and another EJB (not shown).

In an embodiment, SQL mapper implementation 640 receives an EJBQL persistence request such as, for example, EJBQL tree structure 630. SQL mapper implementation 640 may include EJBQL processor 642, EJB container processor 644, and SQL assembler 646. Since EJBQL tree structure 630 represents a user-defined EJBQL statement, in an embodiment, it may be interpreted by EJBQL processor 642. In an embodiment, EJBQL processor 642 traverses EJBQL tree structure 630 (e.g., with the help of classes such as 532-538, shown in FIG. 5) and generates a command(s) (e.g., method call(s)) for each node of tree structure 630.

In an embodiment, SQL assembler 646 generates SQL tree structure 610 in a step-wise fashion as it receives the command sequence from EJBQL processor 642. For example, as EJBQL processor 642 traverses select node 638 and where node 636, SQL assembler 646 may generate select node 611 and p.ID node 613 (representing the primary key of the other EJB (not shown) to which the relation phone of EJB AddressBean 620 is pointing) as well as where node 612 and AND node 615 and an equal join condition node 614 to realize the relation phone of EJB AddressBean 620. In an embodiment, SQL assembler 646 generates node elements for SQL tree structure 610 that are database-independent (e.g., elements selected from a subset of SQL-92 that are database-independent). In an alternative embodiment, an embodiment, SQL assembler 646 may generate platform-independent and/or platform dependent SQL statements.

The interaction between an EJB container (e.g., EJB container 340, shown in FIG. 3) and a persistence layer (e.g., persistence layer 352, shown in FIG. 3) may vary depending on whether the interaction is occurring at design-time, deploy-time, or startup time. The term "design-time" refers to the design and development of computer software. The term "deploy-time" refers to intervals of time when software is being deployed to, for example, an application server. The term "startup" time refers to an interval of time during which software is starting. The term "runtime" refers to the actual execution of software.

Figure 7:
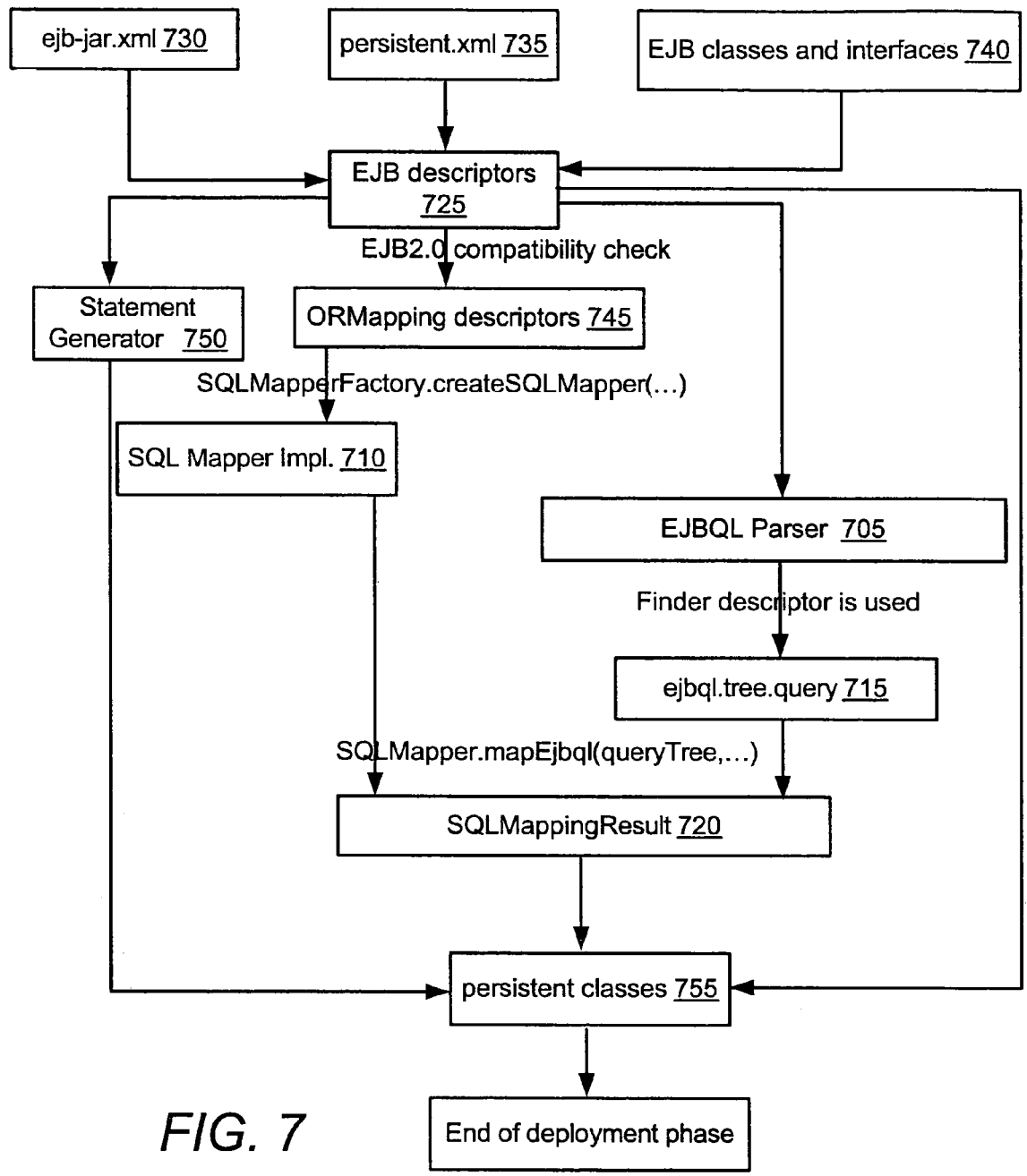
FIG. 7 is a block diagram illustrating certain aspects of interacting with a persistence layer during deploy-time, according to an embodiment of the invention.

FIG. 7 is a block diagram illustrating certain aspects of interacting with a persistence layer, during deploy-time, according to an embodiment of the invention. In an embodiment, an EJB container may interact with, for example, three components of a persistence layer: EJQL parser 705, SQL mapper implementation 710, and catalog reader 805 (shown, e.g., in FIG. 8). In an embodiment, EJBQL parser 705 parses EJBQL persistence requests to form tree structure representations of the EJBQL persistence requests (e.g., tree structure 630, shown in FIG. 6a). EJBQL parser 705 may also validate EJBQL persistence requests by checking the tree structure representation of the request against one or more syntactical and/or semantical rules defining compliance (or partial compliance) with a version of the EJBQL (e.g., the version established in one of the EJB specifications). The EJB specification may refer to any of the EJB specifications including, for example, "Enterprise Java Bean Specification 2.0." In one embodiment, EJBQL parser 705 may be configured (e.g., via a switch) to validate an EJBQL persistence request against a selected version of the EJB specification (e.g., EJB 2.0 or EJB 2.1).

In the illustrated embodiment, SQL mapper implementation 710 maps EJBQL persistence requests to appropriate SQL statements. SQL mapper implementation 710 may receive EJBQL tree representation 715 and return SQL mapping result 720 to the EJB container. In an embodiment, SQL mapping result 720 describes the generated SQL statement and may also describe the input variables used and the result set created by the SQL statement. In an embodiment, SQL mapper implementation 710 attempts to generate SQL statements that comply with a specified SQL grammar (e.g., an SQL grammar that defines a database-independent SQL statement). If SQL mapper implementation 710 cannot generate an SQL statement that complies with a specified SQL grammar, then it may inform the EJB container via, for example, SQL mapping result 720 that the generated SQL statement is to be considered native. In one embodiment, both EJB 2.0 and EJB 2.1 are supported indistinctively.

Figure 15:
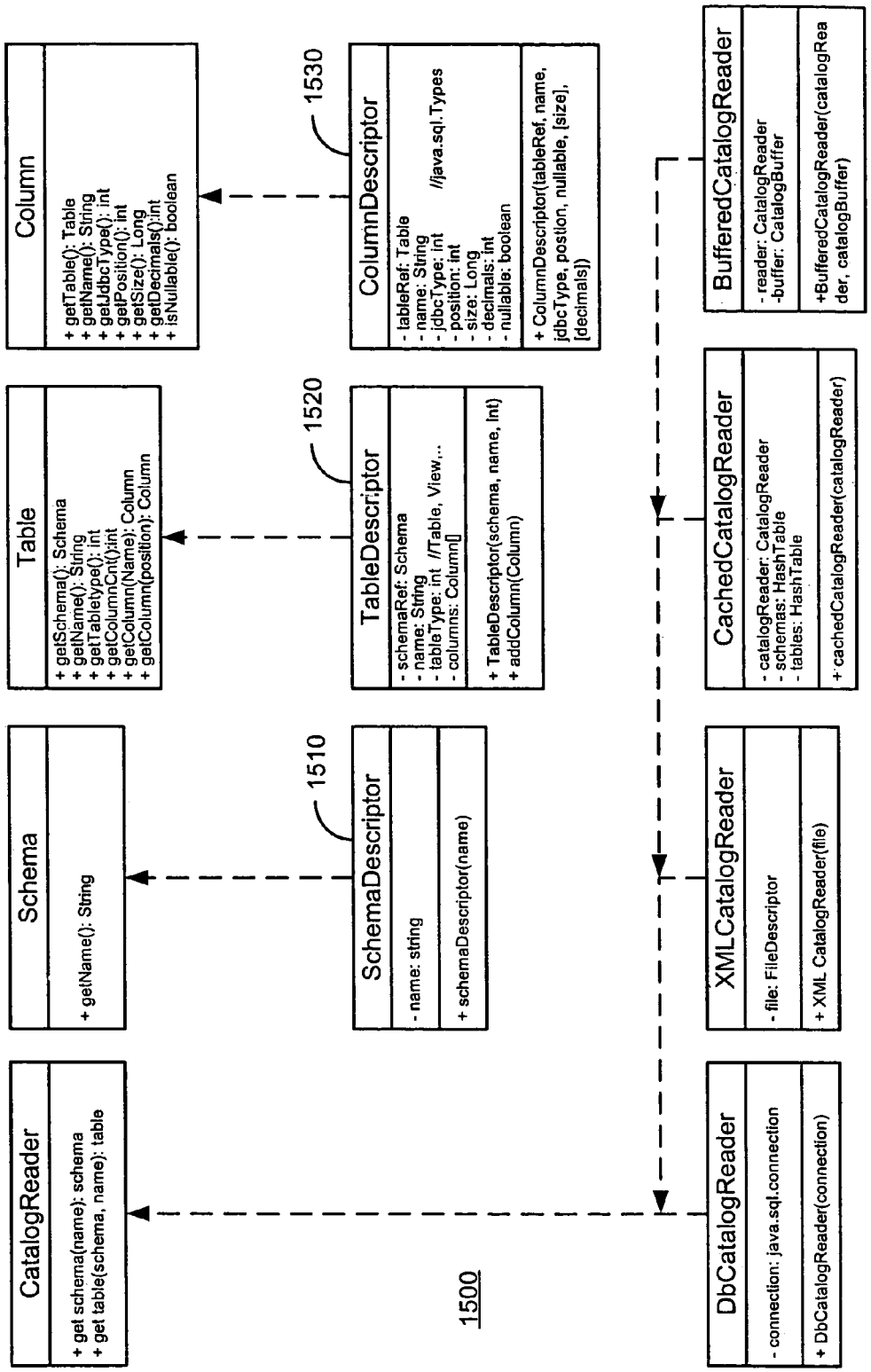
FIG. 15 is a class diagram that illustrates selected elements of one example of a catalog reader.

In an embodiment, the EJB container employs catalog reader 805 (shown in FIG. 8) to validate its OR mapping schema against the underlying database and/or catalog information that provides a database schema. FIG. 15 is a class diagram that illustrates selected elements of one example of a catalog reader. In an embodiment, catalog reader 1500 accesses database metadata (also referred to as catalog information) provided by, for example, a data dictionary and/or the database. For example, catalog reader 1500 may access SchemaDescriptor 1510, TableDescriptor 1520, and/or ColumnDescriptor 1530 to determine the database schema.

Referring again to FIG. 7, EJB descriptors 725 may describe one or more EJBs and may include a description of EJB persistence fields and a description of relationships between EJBs. In an embodiment, EJB descriptors 725 are created from EJB metadata. EJB metadata may include EJB deployment descriptor 730, persistence descriptor (or OR mapping schema) 735, and/or EJB classes and interfaces 740. EJB descriptors 725 may be generated in a markup language (e.g., the eXtensible Markup Language (XML)).

In an embodiment, a compatibility check is performed on EJB descriptors 725 to determine whether they are compatible with a specified version of the EJB specification (e.g., EJB 2.0 or EJB 2.1). In an embodiment, one or more elements of EJB descriptors 725 may indicate which version of the EJB specification was used to create the EJBs. A compatibility check may include referencing these elements to determine whether they are the same as the specified version of the EJB specification (e.g., EJB 2.0). In an embodiment, EJB descriptors provide the basis for OR mapping descriptors 745. OR mapping descriptors 745 may be, for example, an implementation of an OR mapping schema.

In an embodiment, EJBQL parser 705 is created to parse EJBQL persistence requests of the find/select methods that are specified in the abstract schema defined by EJB descriptors 725. In one embodiment, each find/select method is described in a FinderDescriptor element that is part of EJB descriptors 725. EJBQL parser 705 may be "prepared" for parsing an EJBQL persistence request by accessing the FinderDescriptor element of the corresponding find/select method. In an embodiment, invocation of a method such as getParseTree( ) on the prepared EJBQL parser 705 creates tree representation 715 of the EJBQL persistence request. In an embodiment, SQL mapper implementation 710 further maps tree representation 715 to an appropriate SQL statement (also represented in the form of a tree).

In an embodiment, SQL mapper implementation 710 provides SQL mapping result 720 in response to a method invocation such as SQLMapper.mapEjbQl( ). The method SQLMapper.mapEjbQl( ) may take as a parameter tree representation 715. In an embodiment, statement generator 750 maps EJB container persistence requests to SQL statements. Persistent classes 755 may include SQL mapping result(s) 720 and the statements generated by statement generator 750. In an embodiment, persistent classes 755 facilitate interaction between an EJB container and a database.

Figure 8:
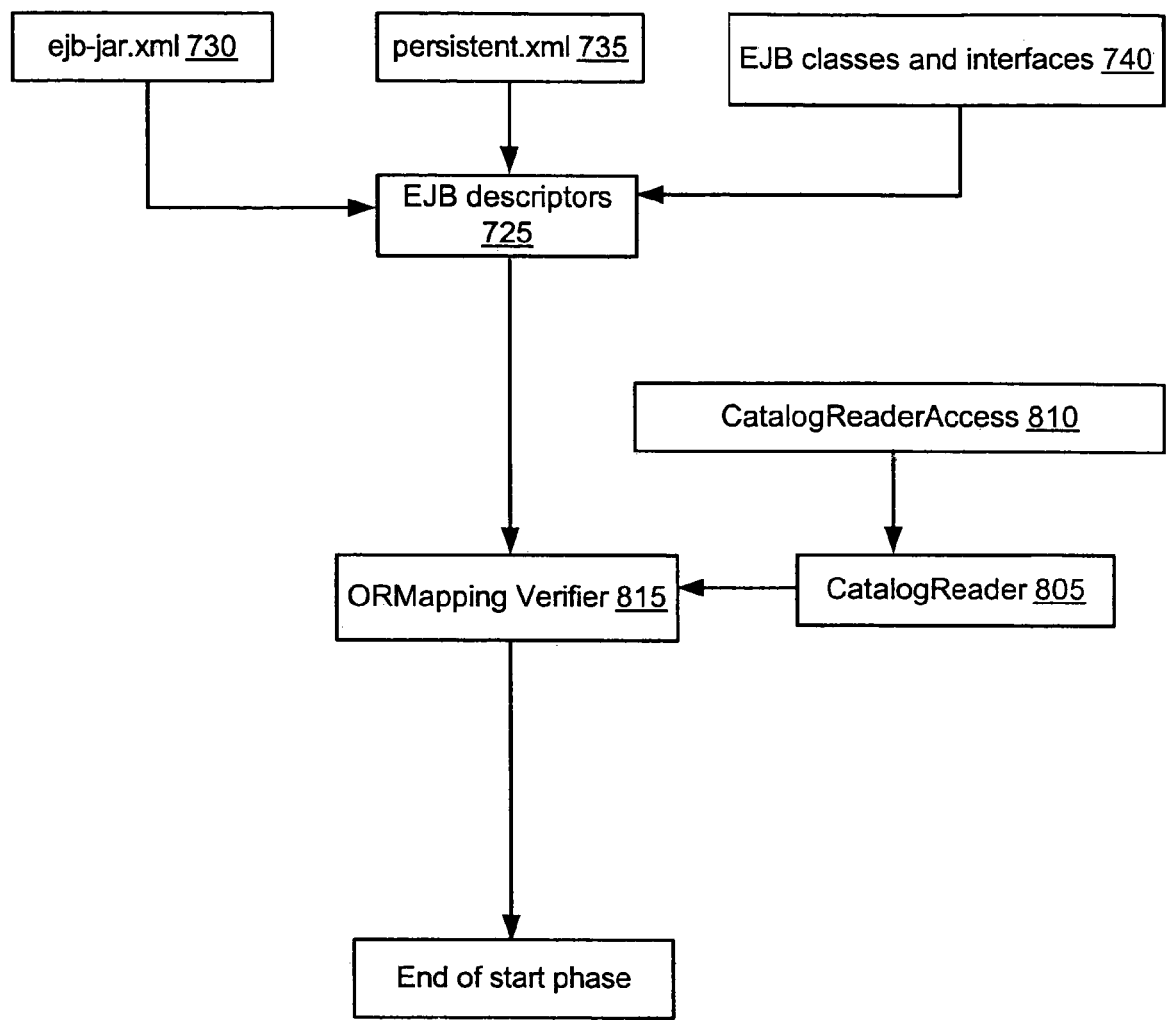
FIG. 8 is a block diagram illustrating certain aspects of interacting with a persistence layer during the application startup phase, according to an embodiment of the invention.

FIG. 8 is a block diagram illustrating certain aspects of interacting with a persistence layer during the application startup phase, according to an embodiment of the invention. In an embodiment, the application is deployed to a particular server node within a cluster of server nodes. In such an embodiment, the EJB metadata (e.g., EJB deployment descriptor 730, OR mapping schema 735, and EJB classes and interfaces 740) may be stored in a configuration manager of the server node.

The application may be started on each of the server nodes and persistent classes 755 (shown in FIG. 7) may be retrieved from, for example, the configuration manager. In an embodiment, application startup includes some of the tasks discussed above with reference to FIG. 7. For example, application startup may include creating EJB descriptors 725, determining whether EJB descriptors 725 are compatible with a specified version of the EJB specification, and implementing a representation of the OR mapping schema. In an embodiment, the application startup phase may include additional tasks. For example, an implementation of catalog reader 805 may be created by an appropriate factory such as catalog reader access factory 810.

In an embodiment, OR mapping verifier 815 uses catalog reader 805 to verify whether one or more OR mapping requirements have been fulfilled. The term "OR mapping requirements" may refer to a correspondence between an OR mapping schema and a database schema as well as compliance with one or more OR mapping rules. The process of verifying the "correspondence" between the schemas may include accessing catalog reader 805 to evaluate database tables that have been defined and deployed (e.g., via a data dictionary). The term "OR mapping rules" refers, for example, to restrictions that define allowable mappings and allowable data types. OR mapping rules may (but are not required) to include some or all of the following rules: restricting the mapping of each EJB to a separate database table; mapping particular CMP fields to individual columns; matching particular Java types to certain JDBC types; defining the use of foreign key columns for Container Managed Relations (CMR); and the like. In an embodiment, the application startup may fail if some or all of the OR mapping requirements have not been fulfilled. The startup phase may finish successfully if the OR mapping requirements have been fulfilled.

Figure 9:
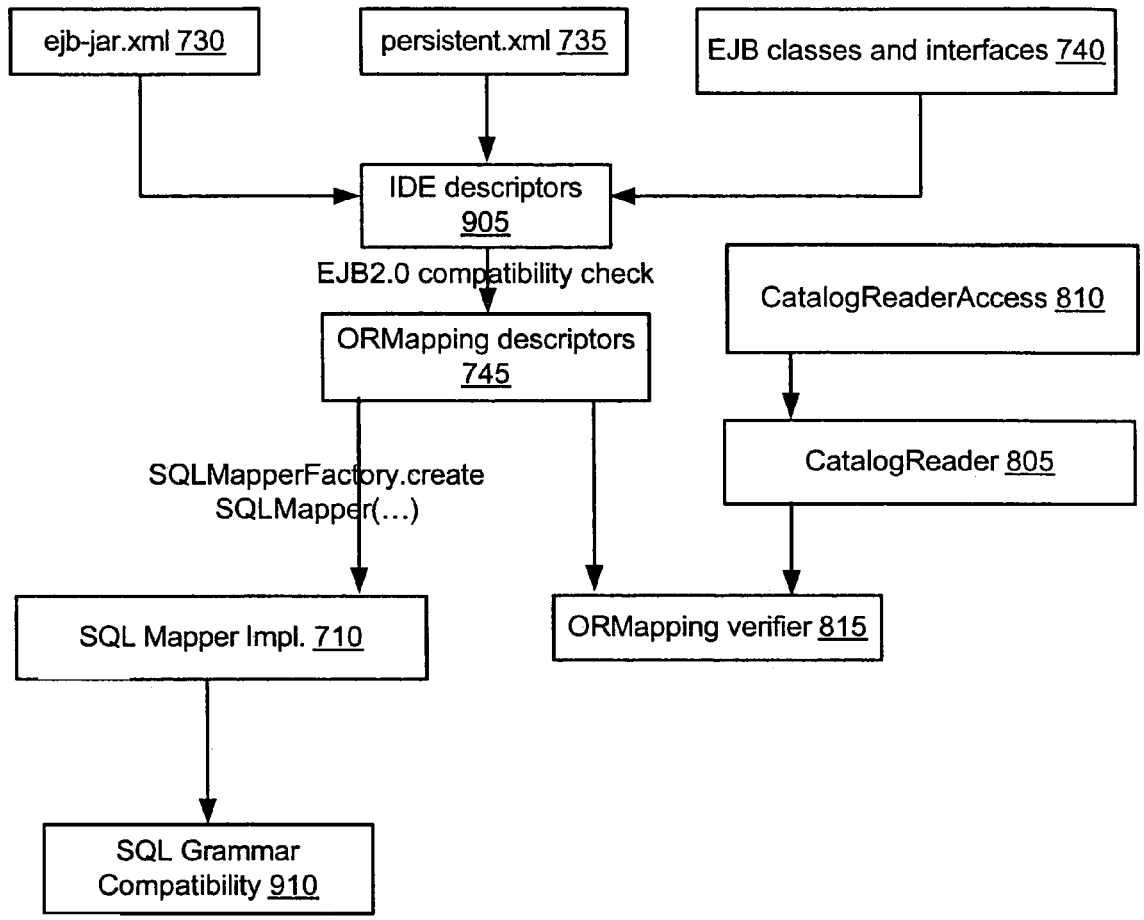
FIG. 9 is a block diagram illustrating certain aspects of interacting with a persistence layer during design-time, according to an alternative embodiment of the invention.
Figure 10:
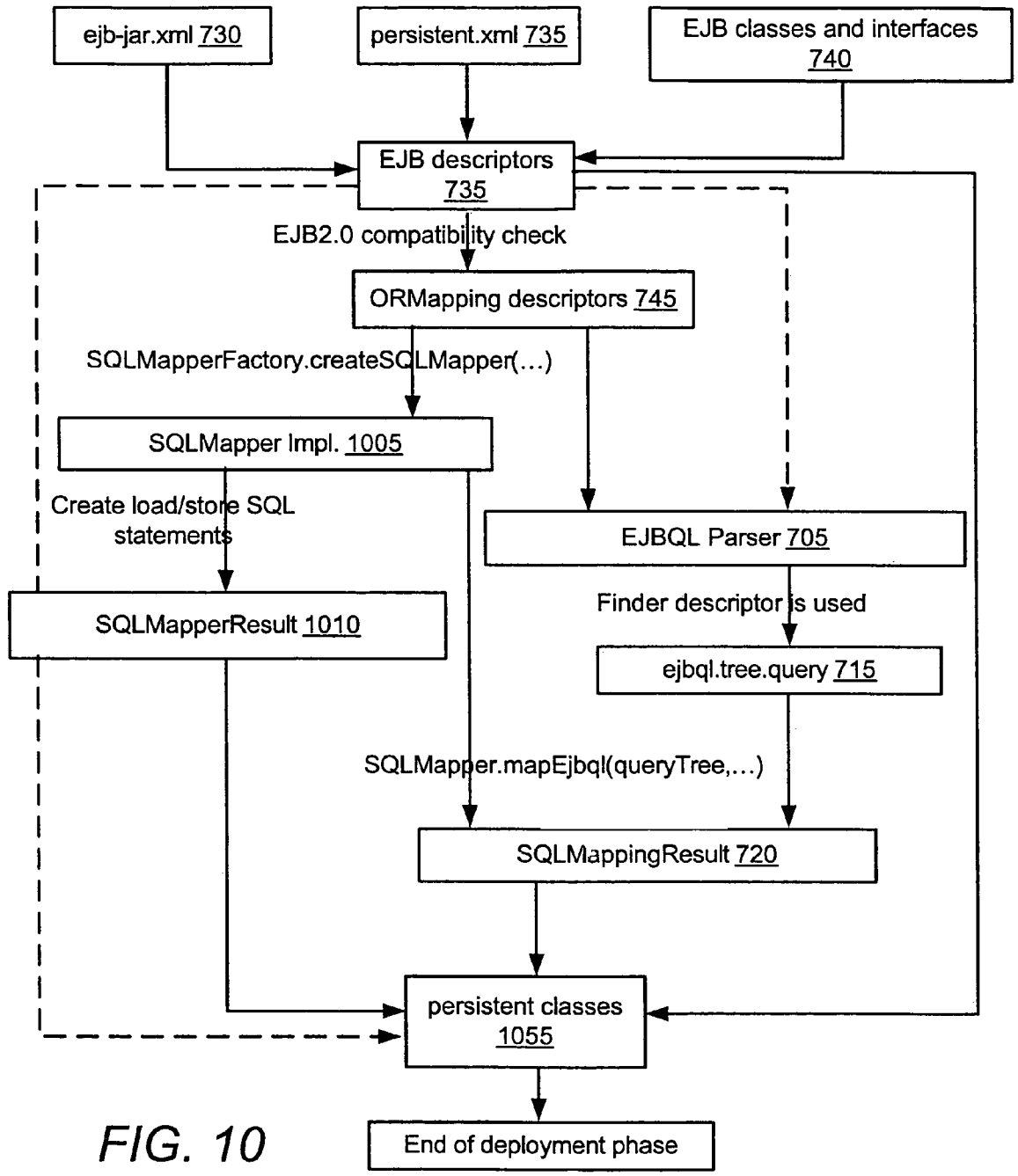
FIG. 10 is a block diagram illustrating certain aspects of interacting with a persistence layer during deploy-time, according to an alternative embodiment of the invention.
Figure 11:
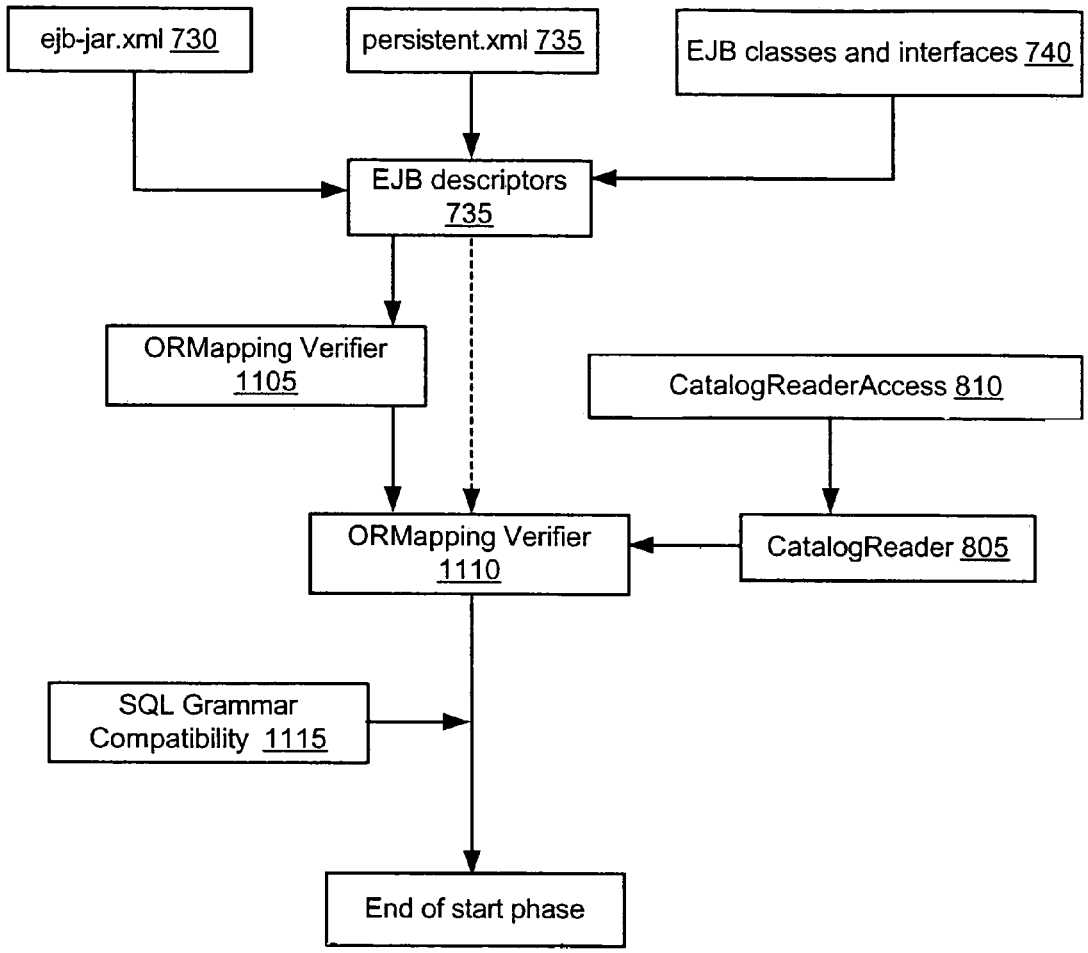
FIG. 11 is a block diagram illustrating certain aspects of interacting with a persistence layer during startup time, according to an alternative embodiment of the invention.

FIGS. 9-11 illustrate an alternative embodiment of the invention. In one alternative embodiment, an SQL mapper implementation (e.g. SQL mapper implementation 430, shown in FIG. 4) may map both EJBQL persistence requests and EJB container persistence requests to appropriate SQL statements. In addition, one or more validity and/or compatibility checks may be performed during a different phase in an alternative embodiment of the invention.

FIG. 9 is a block diagram illustrating certain aspects of interacting with a persistence layer during design-time, according to an alternative embodiment of the invention. In the illustrated embodiment, an in-memory representation (e.g., one or more data structures resident in volatile memory) of EJB metadata is created. For ease of discussion, this in-memory representation of EJB metadata is referred to as Integrated Development Environment (IDE) descriptors 905. EJB metadata typically includes information that specifies a version of the EJB specification that is adhered to, at least in part, by the EJB. For example, EJB deployment descriptor 730 may include a schema element that specifies a version of the EJB specification. In an embodiment, IDE descriptors 905 include this EJB specification information. A compatibility check may be performed to determine whether IDE descriptors 905 are compliant with a specified version of the EJB specification (e.g., EJB 2.0 or EJB 2.1). In one embodiment, this compatibility check may include comparing the EJB specification information from IDE descriptors 905 with a reference to a specified EJB specification to ensure that the two are compatible.

In an embodiment, OR mapping descriptors 745 are implemented based, at least in part, on the information provided by IDE descriptors 905. OR mapping verifier 815 may perform some or all of the OR mapping verification, discussed above with reference to FIG. 8, using the OR mapping schema provided by OR mapping descriptors 745. In an embodiment, an SQL mapper factory (not shown) creates SQL mapper implementation 710 based, at least in part, on OR mapping descriptors 745. As discussed above, SQL mapper implementation 710 maps EJB persistence requests to SQL statements. In an embodiment, the SQL grammar compatibility checker 910 determines whether the SQL statements are compatible with a specified SQL grammar. The term "SQL grammar" refers to one or more syntactical and/or semantical rules that define a permissible SQL statement. In one embodiment, the SQL grammar defines a set of SQL statements that are database-independent. For example, the grammar may define a set of SQL statements that are a subset of standard SQL-92 statements, for example, a subset of statements that comply with the American National Standards Institute/International Organization or Standardization (ANSI/ISO) 9075: 1992 Information Technology—Database Languages—SQL standard (hereinafter, the SQL-92 Standard). The subset of standard SQL-92 statements may be selected, at least in part, based on whether they are database-independent. In one embodiment, the subset of standard SQL-92 statements is supplemented with additional SQL statements that are known to be database-independent.

In an embodiment, if the EJB specification compatibility check, OR mapping verification, and/or SQL grammar verification are performed during design-time then they may be skipped during deploy-time and startup time. In an alternative embodiment, one or more of the compatibility checks and verification processes may be performed at deploy-time and/or startup time. In one embodiment, the various compatibility checks and verification processes are selectively performed at deploy-time and/or startup time based on the settings of one or more switches (not shown).

FIG. 10 is a block diagram illustrating certain aspects of interacting with a persistence layer during deploy-time, according to an alternative embodiment of the invention. In the illustrated embodiment, EJBQL parser 705 (e.g., a context) is created using OR mapping descriptors 745 rather than EJB descriptors 735 (as shown by the doted line indicating an alternative implementation). In such an embodiment, if EJB descriptors 735 (e.g., the classes within the descriptors) are changed (e.g., to implement compatibility with a different version of the EJB specification), then EJBQL parser 705 (and the other elements shown in FIG. 10) need not be changed because they are based on OR mapping descriptors 745.

In the illustrated embodiment, SQL mapper implementation 1005 maps both EJBQL persistence requests and EJB container persistence requests to appropriate SQL statements. For example, SQL mapper implementation 1005 may return SQL mapping result 1010 in response to an EJB container persistence request and may return SQL mapping result 720 in response to an EJBQL persistence request. In an embodiment, persistent classes 1055 are persistent classes that are generated during deploy-time such as SQL mapping results 1010 and 720.

FIG. 11 is a block diagram illustrating certain aspects of interacting with a persistence layer during startup time, according to an alternative embodiment of the invention. In the illustrated embodiment, OR mapping verifier 1110 is based on OR mapping descriptors 1105 rather than EJB descriptors 735. In such an embodiment, EJB descriptors 735 may be changed (e.g., to implement compatibility with a different version of the EJB specification) without changing OR mapping verifier 1110 (or at least some of the other elements shown in FIG. 11).

Some applications (and the EJBs that, in part, implement these applications) are only compatible with a specified SQL grammar (e.g., a native SQL grammar provided by a vendor). In contrast, certain datasources (e.g., databases) are designed to be used with a database-independent SQL grammar. In an embodiment, if an application (or its EJB) is marked as requiring a specific SQL grammar, then SQL grammar checker 1115 may determine whether the associated datasource requires a different SQL grammar (e.g., a database-independent SQL grammar). In an embodiment, application startup may fail if an application and an associated datasource require different SQL grammars.

Figure 12:
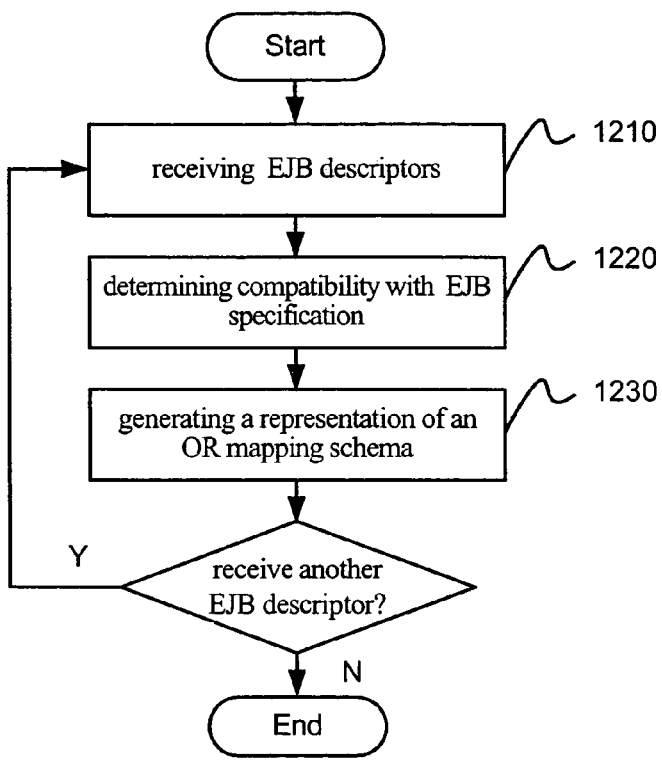
FIG. 12 is a flow diagram illustrating selected aspects of a method for interacting with a persistence layer at deploy-time according to an embodiment of the invention.
Figure 14:
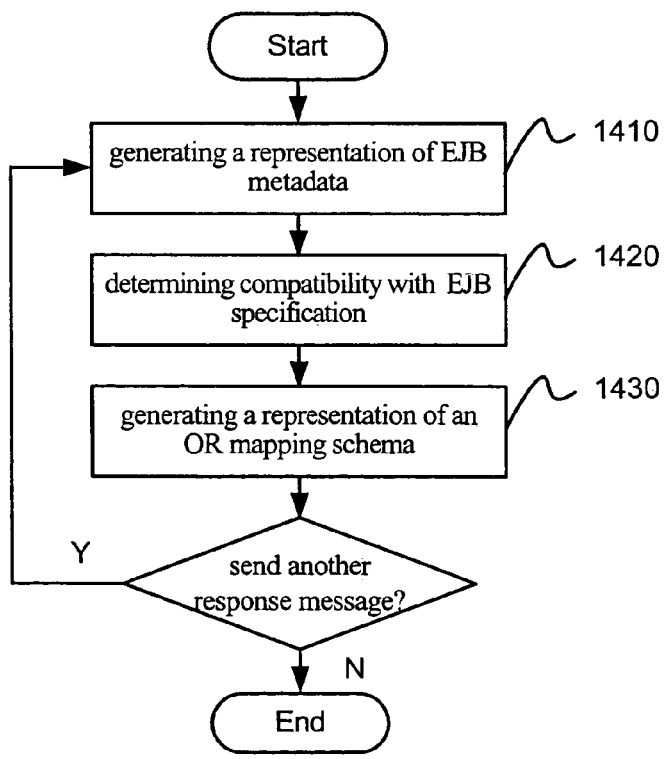
FIG. 14 is a flow diagram illustrating selected aspects of an alternative method for interacting with a persistence layer at design-time according to an alternative embodiment of the invention.
Figure 13:
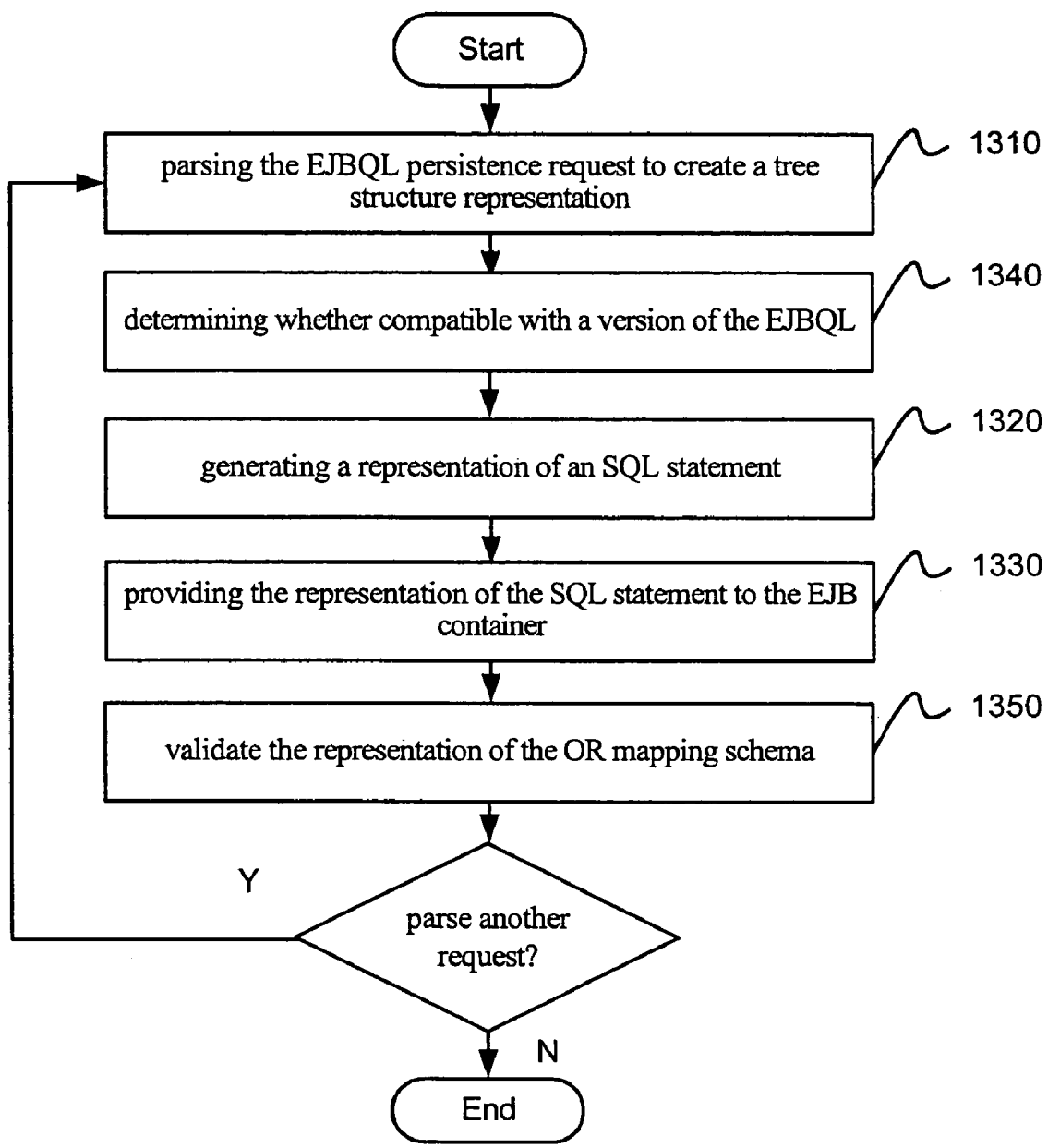
FIG. 13 is a flow diagram illustrating selected aspects of a method for interacting with a persistence layer according to an embodiment of the invention.

Turning now to FIGS. 12-14, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 12 is a flow diagram illustrating selected aspects of a method for interacting with a persistence layer at deploy-time according to an embodiment of the invention. Referring to process block 1210, the persistence layer receives one or more EJB descriptors (e.g., EJB descriptors 725, shown in FIG. 7) from an EJB container. In an embodiment, the EJB descriptors are based on EJB metadata and may include an EJBQL persistence request. Referring to process block 1220, the persistence layer determines whether the EJB descriptors are compatible with a specified version of the EJB specification. Referring to process block 1230, a representation of an OR mapping schema (e.g., OR mapping descriptors 745, shown in FIG. 7) is generated based, at least in part, on the EJB descriptors.

FIG. 13 is a flow diagram illustrating selected aspects of a method for interacting with a persistence layer according to an embodiment of the invention. Referring to process block 1310, an EJB parser (e.g., EJB parser 705, shown in FIG. 7) parses an EJBQL persistence request to create a tree structure representation of the request (e.g., tree structure 630, shown in FIG. 6a). Referring to process block 1340, the parser may determine whether the EJBQL persistence request is compatible with a specified version of the EJB specification. In one embodiment, an SQL mapper implementation receives the tree structure representation of the persistence request as an input and returns an SQL statement (or a SQL mapping result that represents the SQL statement) as shown by process block 1320. The SQL statement may be returned to the EJB container as shown by reference numeral 1330.

Referring to process block 1350, the representation of the OR mapping schema (e.g., OR mapping descriptors 745, shown in FIG. 7) is verified to ensure that it complies, at least in part, with one or more OR mapping requirements. As discussed above, with reference to FIG. 8, verifying the OR mapping schema may include determining whether the OR mapping schema matches a database schema. The process of verifying the OR mapping schema may also include (or may alternatively involve) determining whether the OR mapping fulfills one or more mapping rules.

FIG. 14 is a flow diagram illustrating selected aspects of an alternative method for interacting with a persistence layer at design-time according to an alternative embodiment of the invention. Referring to process block 1410, an in-memory representation of EJB metadata (e.g., IDE descriptors 905, shown in FIG. 9) is generated at design-time. In an embodiment, one or more validity/compatibility checks may be performed based, at least in part, on the in-memory representation of EJB metadata. Referring to process block 1420, the in-memory representation of EJB metadata is checked to determine whether it is compatible with a specified version of the EJB specification. Checking for compatibility with a specified version of the EJB specification is further discussed above with reference to FIG. 9. Referring to process block 1430, a representation of an OR mapping schema (e.g., OR mapping descriptors 745, shown in FIG. 7) is generated based, at least in part, on the in-memory representation of EJB metadata.

Figure 16:
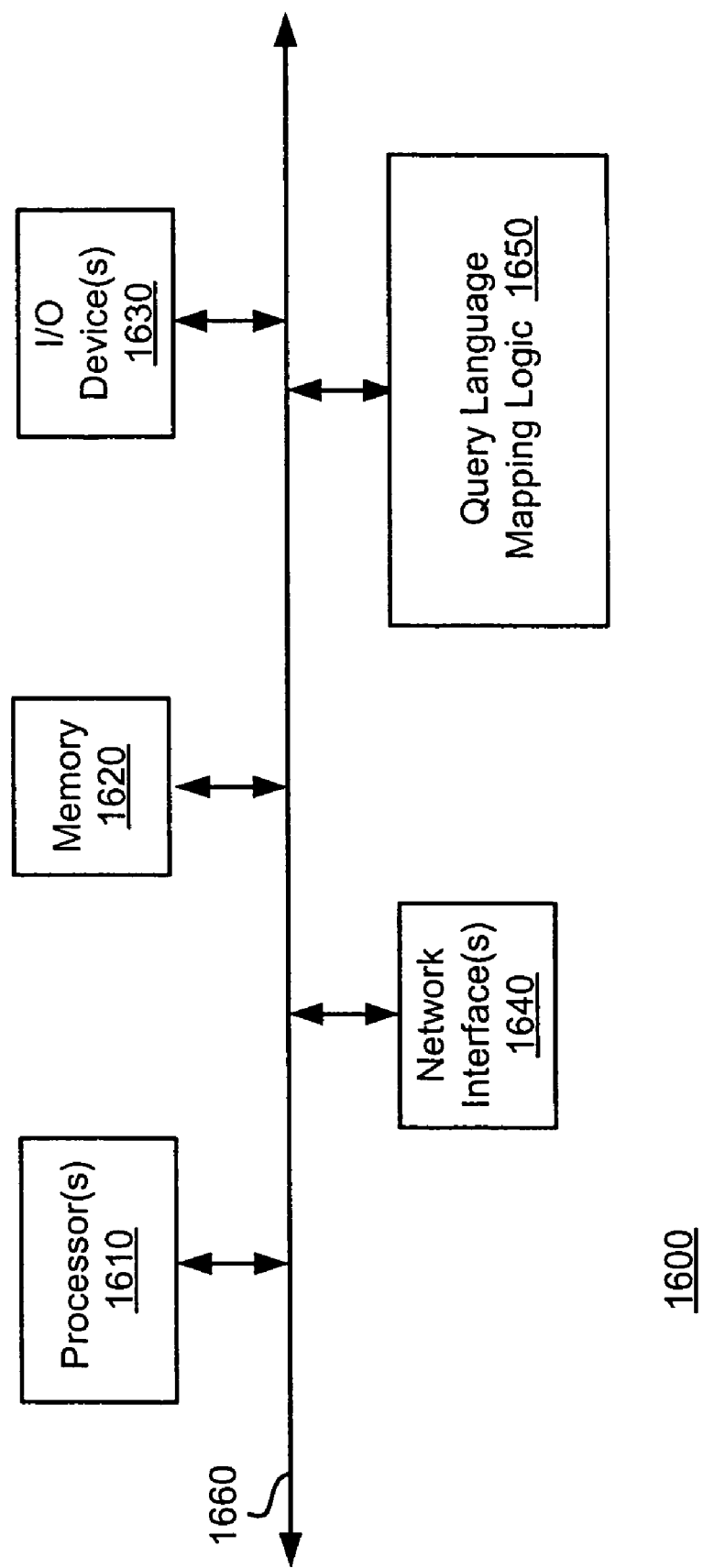
FIG. 16 is a block diagram of a node implemented according to an embodiment of the invention.

FIG. 16 is a block diagram of node 1600 implemented according to an embodiment of the invention. Node 1600 may include: processor(s) 1610, memory 1620, one or more Input/Output devices 1630, network interface(s) 1640, and query language mapping logic 1650. The illustrated elements may be connected together through system interconnection 1660. Processor(s) 1610 may include a microprocessor, microcontroller, field programmable gate array (FPGA), application specific integrated circuit (ASIC), central processing unit (CPU), programmable logic device (PLD), and similar devices that access instructions from system storage (e.g., memory 1620), decode them, and execute those instructions by performing arithmetic and logical operations.

Query language mapping logic 1650 may facilitate one or more validity/compatibility checks of one or more elements of a query language mapping architecture. Query language mapping logic 1650 may be executable content, control logic (e.g., ASIC, PLD, FPGA, etc.), firmware, or some combination thereof, in an embodiment of the invention. In embodiments of the invention in which query language mapping logic 1650 is executable content, it may be stored in memory 1620 and executed by processor(s) 1610.

Memory 1620 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1620 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1620 may store program modules such as routines, programs, objects, images, data structures, program data, and other program modules that perform particular tasks or implement particular abstract data types that facilitate system use.

One or more I/O devices 1630 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 1660 permits communication between the various elements of node 1600. System interconnection 1660 may include a wide variety of signal lines including one or more of a memory bus, peripheral bus, local bus, host bus, bridge, optical, electrical, acoustical, and other propagated signal lines.

Elements of embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiment of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method in an Object-Relational interpretation layer that provides an interface between an application and a database, comprising:

receiving a persistency request from the application comprising a plurality of persistent data elements to be implemented at the database via one or more database operations, the persistent data elements representing data from the application;

organizing the persistent data elements into a tree structure comprising a plurality of nodes, wherein each node of the tree structure comprises one persistent data element, the plurality of nodes representing the plurality of persistent data elements;

mapping each node of the tree structure to a Structured Query Language (SQL) sub-expression based on the persistent data element of each node, wherein each node having a combined condition of a WHERE clause is mapped via a combined-conditional processor of the Object-Relational interpretation layer, each node having an elementary condition of the WHERE clause is mapped via a simple-conditional processor of the Object-Relational interpretation layer, each node having a complex arithmetic expression is mapped via an arithmetic processor of the Object-Relational interpretation layer, and wherein each node having a string expression is mapped via a string processor of the Object-Relational interpretation layer;

assembling the SQL sub-expressions into an SQL statement;

determining whether the SQL statement is database-independent by comparing the SQL statement with a listing of standardized SQL statements known to be database-independent; and re-mapping one or more portions of the SQL statement to an alternative SQL statement having one or more sub-queries when the SQL statement is determined not to be database-independent, wherein the alternative SQL statement having the one or more sub-queries represents the plurality of persistent data elements in a database-independent SQL form.

2. The method of claim 1, further comprising:
issuing the plurality of database-independent sub-queries to the database.

3. The method of claim 1, further comprising:
determining whether the database supports the SQL statement determined not to be database-independent.

4. The method of claim 3, further comprising:
issuing SQL statement determined not to be database-independent to the database when the database is determined to support the SQL statement.

5. The method of claim 1, further comprising:
notifying the application that the SQL statement is not database-independent; and
notifying the application that the alternative SQL statement having the one or more sub-queries is database-independent.

6. The method of claim 1, wherein the listing of standardized SQL statements comprises:
a listing of one or more syntactic and/or semantic rules defining compliance with an SQL related standard.

7. A computer-readable storage medium having instructions stored thereon that, when executed by a processor, cause the processor to perform a method comprising:
receiving a persistency request at an Object-Relational interpretation layer from an application layer, the persistency request comprising a plurality of persistent data elements to be implemented at a database layer via one or more database operations, wherein the persistent data elements represent data from the application layer;
organizing the persistent data elements into a tree structure comprising a plurality of nodes, wherein each node of the tree structure comprises one persistent data element, the plurality of nodes representing the plurality of persistent data elements;
mapping each node of the tree structure to a Structured Query Language (SQL) sub-expression based on the persistent data element of each node, wherein each node is mapped via one of a combined-conditional class, a simple-conditional class, an arithmetic class, and a string class based on the persistent data element of the node;
assembling the SQL sub-expressions into an SQL statement; determining whether the SQL statement is database-independent by comparing the SQL statement with a listing of standardized SQL statements known to be database- independent; and
re-mapping one or more portions of the SQL statement to an alternative SQL statement having one or more sub-queries when the SQL statement is determined not to be database-independent, wherein the alternative SQL statement having the one or more sub-queries represents the plurality of persistent data elements in a database-independent SQL form.

8. The computer-readable medium of claim 7, wherein the method further comprises:
issuing the plurality of database-independent sub-queries to the database layer.

9. The computer-readable medium of claim 7, wherein the method further comprises:
determining whether the database layer supports the SQL statement determined not to be database-independent.

10. The computer-readable medium of claim 9, wherein the method further comprises:
issuing SQL statement determined not to be database-independent to the database layer when the database layer is determined to support the SQL statement.

11. The computer-readable medium of claim 7, further comprising:
notifying the application layer that the SQL statement is not database-independent; and
notifying the application layer that the alternative SQL statement having the one or more sub-queries is database-independent.

12. The computer-readable medium of claim 7, wherein the listing of standardized SQL statements comprises:
a listing of one or more syntactic and/or semantic rules defining compliance with an SQL related standard.

13. The computer-readable medium of claim 7, wherein mapping each node of the tree structure to an SQL sub-expression based on the persistent data element of each node comprises:
interpreting nodes of the tree structure having combined conditions of a WHERE clause via the combined-conditional class;
interpreting nodes of the tree structure having elementary conditions, simple arithmetic expressions, and Boolean conditions via the simple-conditional class;
interpreting nodes of the tree structure having complex arithmetic expressions via the arithmetic class; and
interpreting nodes of the tree structure having string expressions via the string class.

14. A system, having a processor, comprising an Object-Relational interpretation layer that provides an interface between an application and a database, comprising:
means for receiving a persistency request from the application comprising a plurality of persistent data elements to be implemented at the database via one or more database operations, the persistent data elements representing data from the application;
means for organizing the persistent data elements into a tree structure comprising a plurality of the plurality of nodes representing the plurality of persistent data elements;
means for mapping each node of the tree structure to a Structured Query Language (SQL) sub-expression based on the persistent data element of each node, wherein each node having a combined condition of a WHERE clause is mapped via a combined-conditional processor, each node having an elementary condition of the WHERE clause is mapped via a simple-conditional processor, each node having a complex arithmetic expression is mapped via an arithmetic processor, and wherein each node having a string expression is mapped via a string processor; means for assembling the SQL sub-expressions into an SQL statement;

means for determining whether the SQL statement is database-independent by comparing the SQL statement with a listing of standardized SQL statements known to be database-independent; and means for re-mapping one or more portions of the SQL statement to an alternative SQL statement having one or more sub-queries when the SQL statement is determined not to be database-independent, wherein the alternative SQL statement having the one or more sub-queries represents the plurality of persistent data elements in a database-independent SQL form.

15. The system of claim 14, further comprising:

means for issuing the plurality of database-independent sub-queries to the database.

16. The system of claim 14, further comprising:

means for determining whether the database supports the SQL statement determined not to be database-independent.

17. The system of claim 16, further comprising:

means for issuing SQL statement determined not to be database-independent to the database when the database is determined to support the SQL statement.

18. The system of claim 14, further comprising:

means for notifying the application that the SQL statement is not database-independent; and means for notifying the application that the alternative SQL statement having the one or more sub-queries is database-independent.

19. The system of claim 14, wherein the listing of standardized SQL statements comprises:

a listing of one or more syntactic and/or semantic rules defining compliance with an SQL related standard.

* * * * *